US012731473B2

(12) United States Patent
Ramesh et al.

(10) Patent No.: US 12,731,473 B2
(45) Date of Patent: Sep. 8, 2026

(54) ALERT SYSTEM FOR REDUCING FALSE POSITIVES

(71) Applicant: ROKU, INC., San Jose, CA (US)

(72) Inventors: Sunil Ramesh, Saratoga, CA (US); Michael Cutter, Golden, CO (US); Gregory Mack Garner, Key Colony Beach, FL (US); Robert Caston Curtis, Napa, CA (US); David Lee Stern, Los Gatos, CA (US); Patrick Alan Brouillette, Tempe, AZ (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/482,214

(22) Filed: Oct. 6, 2023

(65) Prior Publication Data

US 2025/0118179 A1 Apr. 10, 2025

(51) Int. Cl.
*G08B 13/16* (2006.01)
*G08B 3/10* (2006.01)

(52) U.S. Cl.
CPC ....... *G08B 13/1681* (2013.01); *G08B 3/1008* (2013.01)

(58) Field of Classification Search
CPC .......................... G08B 13/1681; G08B 3/1008
See application file for complete search history.

(56) References Cited

U.S. PATENT DOCUMENTS 8,917,186 B1* 12/2014 Grant .................. G08B 29/126 340/3.3
2013/0257611 A1* 10/2013 Lamb .................... G08B 13/02 340/501
2018/0007331 A1* 1/2018 Levcovich ............. H04N 23/84
2021/0383822 A1* 12/2021 Roberts ................ G01C 21/383
2022/0408184 A1* 12/2022 Heijnen ................. H04R 3/005

FOREIGN PATENT DOCUMENTS

WO WO-2018/185723 A1 10/2018
WO WO 2021104818 A1 6/2021

OTHER PUBLICATIONS

The Partial European Search Report directed to European Application No. 24204019.4, mailed Mar. 6, 2025; 15 pages.
Extended European Search Report for European Application No. EP24204019, mailed on Jun. 18, 2025, 14 pages.

* cited by examiner

*Primary Examiner* — Davetta W Goins
*Assistant Examiner* — Sharmin Akhter
(74) *Attorney, Agent, or Firm* — Sterne, Kessler, Goldstein & Fox P.L.L.C.

(57) ABSTRACT

Disclosed herein are system, method and/or computer program product embodiments, and/or combinations and sub-combinations thereof, for reducing and/or eliminating false positive alarm triggers. Detector devices positioned throughout an environment scan for known events that are likely indicative of an alarm condition. A source device that may generate such a sound or image may imprint a fingerprint on to the event that can be detectable by the detector devices but is imperceptible to humans. Additionally, the detector devices may use directionality and known locations of source devices to determine if a triggering event occurred at a known location of a source device. An alarm suppression decision may occur at the detector device and/or relevant information may be sent from the various detectors to a central console for a final alarm decision.

16 Claims, 11 Drawing Sheets

300

ALERT SYSTEM FOR REDUCING FALSE POSITIVES

BACKGROUND

Field

This disclosure is generally directed to systems and methods for reducing false positives in an alert system.

SUMMARY

Provided herein are system, apparatus, article of manufacture, method and/or computer program product embodiments, and/or combinations and sub-combinations thereof, for reducing false positives in an alert system. An example aspect operates by using a plurality of detection devices configured to detect sounds, visual images, or other events. Certain events may trigger an alert. However, some of these triggers may be generated by another device, such as a television, rather than actually occurring in the environment. Therefore, using any of a variety of different techniques disclosed herein, the system is able to detect when these triggers have been generated, and disregard them.

In some aspects, an alarm system is disclosed that includes a detector device configured to detect an event within an environment, one or more memories that stores a plurality of alarm-triggering events, and at least one processor. The at least one processor is configured to receive the event from the detector device, perform an analysis on the received event, detect a match between the received event and the stored plurality of alarm-triggering events based on the analysis, determine, based on the analysis, whether the event includes a known fingerprint embedded therein, and trigger or suppress an alarm based on the determining.

In some aspects, the event is an audio event and the detector device is a microphone.

In some aspects, the fingerprint is an audio signal added to the event by a source device that is outside a human hearing range.

In some aspects, the microphone is a high definition microphone.

In some aspects, the alarm system further includes a transceiver configured to receive a notification message from an external device notifying the alarm system device of an incoming alarm-triggering event.

In some aspects, the notification message further includes an identification of the alarm-triggering event and a timestamp.

In some aspects, the processor is further configured to determine, based on the analysis, that the received event corresponds to the identification included in the notification message, determine that the received event was received within a predetermined time from the timestamp, and suppress an alarm to be triggered by the received event.

In some aspects, a method is disclosed for suppressing false alarms within an alarm system environment. The method includes monitoring, by at least one computer processor, an environment, detecting an event based on the monitoring, comparing the detected event to one or more known alarm-triggering events, determine, based on the comparing that the detected event matches one of the known alarm-triggering events, analyzing, based on the determining, the detected event for a fingerprint signal embedded therein, and triggering or suppressing an alarm based on the analyzing.

In some aspects, the event is an audio event detected by one or more microphones.

In some aspects, the fingerprint is associated with a source device that generated the event.

In some aspects, the method for includes receiving a notification message from an external device, the notification message indicating that the event is incoming.

In some aspects, the notification message is received via a separate communication channel.

In some aspects, the notification message further includes an identification of the alarm-triggering event and a timestamp, and the method further includes determining, based on the analysis, that the received event corresponds to the identification included in the notification message, determining, that the received event was received within a predetermined time from the timestamp, and suppressing an alarm to be triggered by the event.

In some aspects, a non-transitory computer-readable medium is disclosed that has stored thereon instructions that, when executed by at least one computing device, cause the at least one computing device to perform operations, including monitoring an environment, detecting an event based on the monitoring, comparing the detected event to one or more known alarm-triggering events, determine, based on the comparing that the detected event matches one of the known alarm-triggering events, analyzing, based on the determining, the detected event for a fingerprint signal embedded therein, and triggering or suppressing an alarm based on the analyzing.

In some aspects, the event is an audio event including one or more audio signals.

In some aspects, the operations further include receiving a notification message from an external device, the notification message indicating that the event is incoming.

In some aspects, the notification message further includes an identification of the alarm-triggering event and a timestamp, and the operations further include determining, based on the analysis, that the received event corresponds to the identification included in the notification message, determining, that the received event was received within a predetermined time from the timestamp, and suppressing an alarm to be triggered by the event.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are method, system, and computer program product aspects, and/or combinations and sub-combinations thereof for detecting and/or preventing false positives in an alert system.

Figure 1:
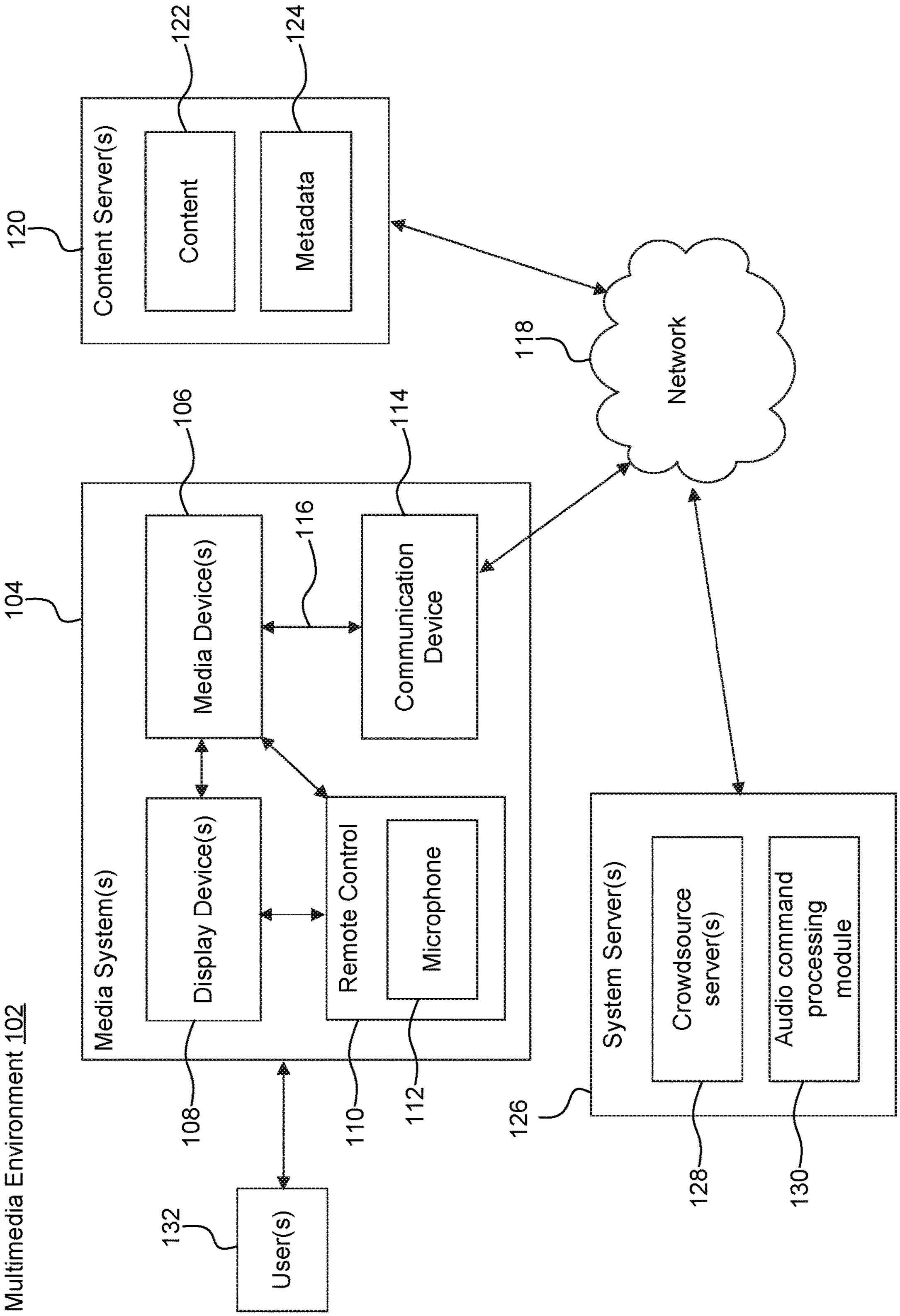
FIG. 1 illustrates a block diagram of a multimedia environment, according to some aspects.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some aspects. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some aspects, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various aspects, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an aspects, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (e.g., content providers, channels or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing aspects and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowd-source server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other source devices, such as the display device 108, smoke or file alarms, etc.). In some aspects, the media device 106 may be audio responsive, and the audio data may represent verbal commands from the user 132 to control the media device 106 as well as other components in the media system 104, such as the display device 108.

In some aspects, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
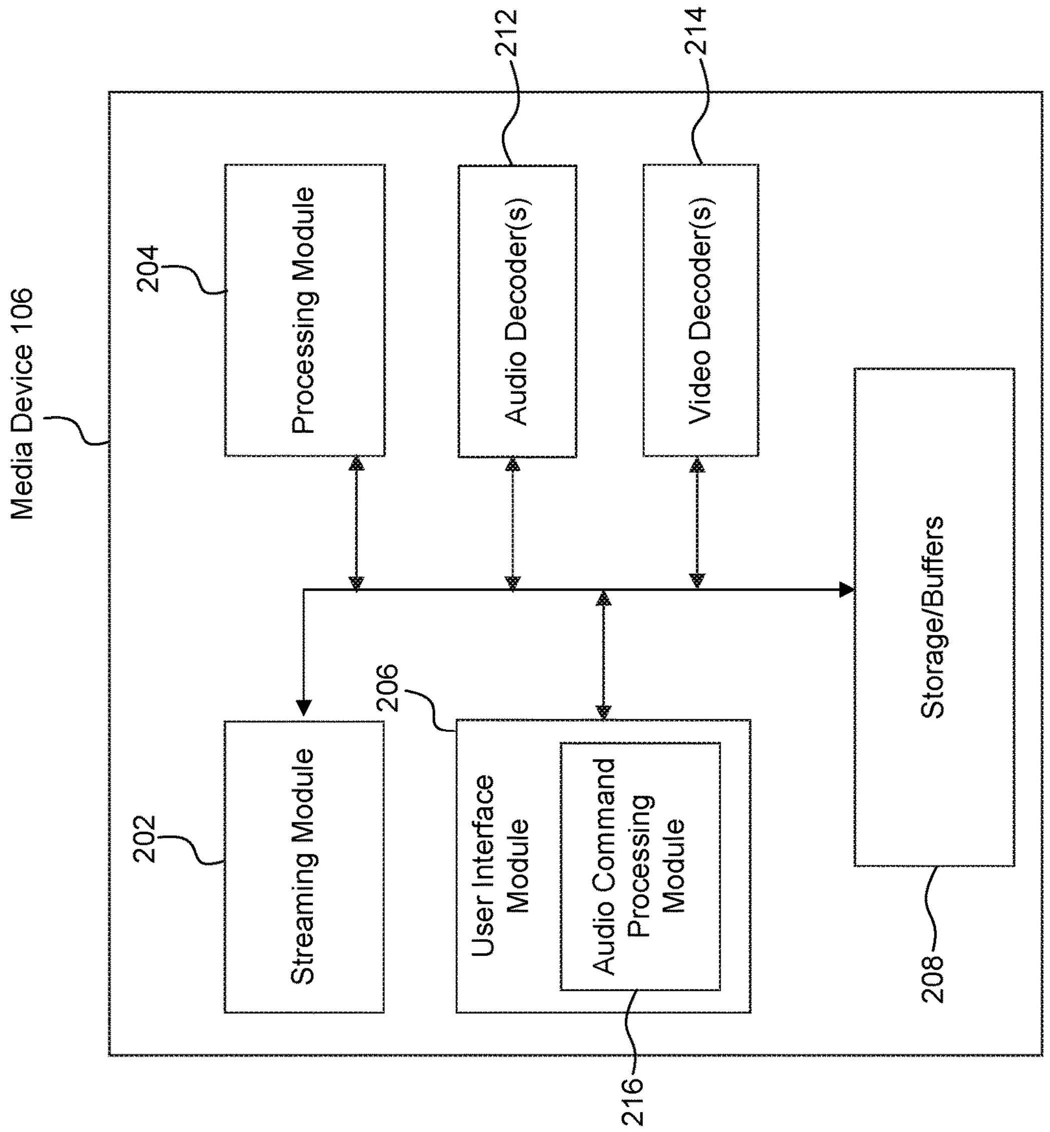
FIG. 2 illustrates a block diagram of a streaming media device, according to some aspects.

In some aspects, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some aspects. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some aspects, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming aspects, the streaming module 202 may transmit the content to the display device 108 in real time or near real time as it receives such content from the content server(s) 120. In non-streaming aspects, the media device 106 may store the content received from content server(s) 120 in storage/buffers 208 for later playback on display device 108.

False-Alarm Suppression System

Referring to FIG. 1, the media devices 106 may exist in thousands or millions of media systems 104. Accordingly, the media devices 106 may lend themselves to false-alarm suppression aspects. In some aspects, one or more detectors may be distributed throughout the environment 100 for detecting various events that may trigger an alarm.

For example, using information received from the media devices 106 in the thousands and millions of media systems 104, the an alarm system may identify events, such as sounds, images, or other occurrences that trigger an alarm. However, a closer review of those events using the methods described herein will cause the media systems 104 to suppress the generation of those alarms, thereby preventing false positives.

Detecting and/or Preventing False Positives in an Alert System

In an exemplary system, various detection devices distributed throughout an environment will detect certain occurrences that may trigger an alert. Such occurrences may include certain sounds, images, videos recording, or others. In one example, the system may detect a noise that sounds like a window breaking. Typically this would trigger a security alert as evidence of a possible break-in or injury.

However, in some instances, the detected occurrence may not have occurred naturally, but rather may have been generated by another device, such as a television, a radio, a children's toy, a computer, a sound synthesizer, etc. In these situations, it is inappropriate to trigger an alert, as there is no actual danger. However, detection systems to date are unable to differentiate effectively between these different situations. The present disclosure addresses this deficiency, providing various mechanisms for detecting and filtering these false positives.

These and other aspects will be described in further detail below with respect to the relevant figures.

Figure 3:
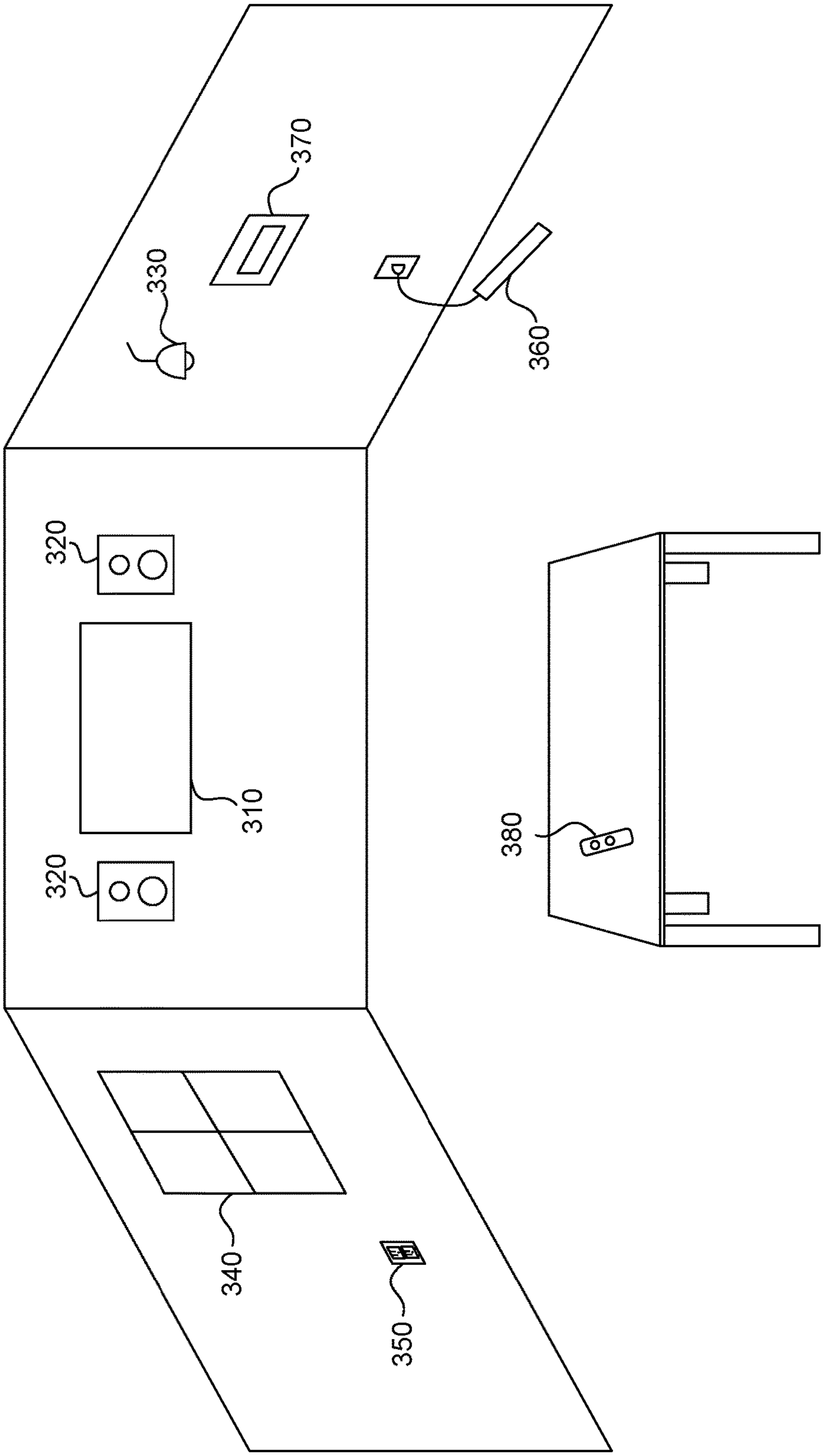
FIG. 3 illustrates an alert environment, according to some aspects.

FIG. 3 illustrates an alert environment 300, according to some aspects. As shown in FIG. 3, the environment 300 may be located within a house or other dwelling. The environment may include several different items located throughout that may act as a detector. For example, as shown in FIG. 3, the environment includes a television 310, speakers 320, a light fixture 330, a window 340, an outlet 350, a power strip 360, a central console 370 and a remote control 380. Various of these devices may act as detectors. For example, current IoT devices, such as light fixture 330, outlet 350, power strip 360, central console 370, and remote control 380 may be equipped with one or more microphones and therefore may act as audio detectors. Additionally, window 340 may be equipped with one or more separate sensors, such as magnetic sensors to detect a window opening event, or a vibration sensor to detect movement of the window. Other similar sensors may be installed or included within other devices or fixtures that detect various events.

Television 310 and speakers 320, on the other hand, function as a different type of detector. Specifically, because the television 310 and speakers 320 will often be the source of the false positive event, they do not include sensors such as microphones to detect the event. Rather, these devices may detect events by performing signal processing on the audio and/or video signals being output by those devices, as will be discussed in further detail below. Therefore, for purposes of this disclosure, these types of detectors will be referred to as source devices. Smoke and file alarms may also function as sources, given that they generate alert sounds when triggered.

In operation, any of these devices may be capable of detecting sounds from the environment that may trigger an alert. In different aspects, sounds may be collected by the various detectors and sent to the central console 370 for processing and decision-making, or the detectors themselves may be equipped with the necessary processing power to perform this functionality. Additionally, or alternatively, sounds and/or decisions may be transmitted to a backend server (not shown) for this processing. Other devices, such as the sound generators, may take various actions to override a potential alarm. Such actions may include fingerprinting an output sound signal to identify it to the detectors as being artificial, or communicating with one of more of the detectors or central console 370 to warn of an incoming alarm-generating sound. These and other aspects and benefits are described below with respect to the following figures.

Figure 4:
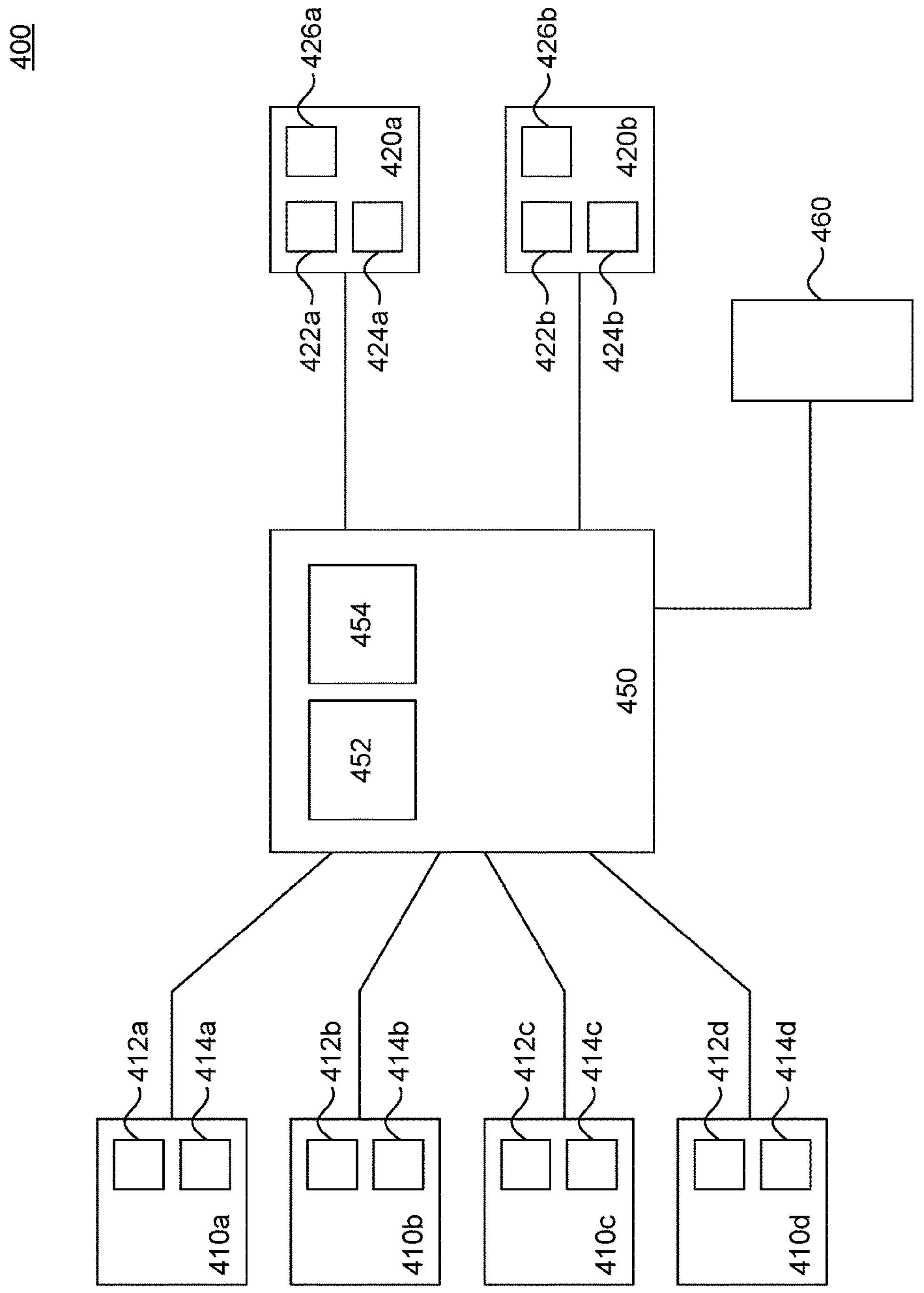
FIG. 4 illustrates a block diagram of an exemplary alert system according to some aspects.

FIG. 4 illustrates a block diagram of an exemplary alert system 400 according to some aspects. As shown in FIG. 4, the system 400 includes a plurality of detectors 410 and a plurality of source devices 420 in communication with a central console 450. In aspects, the central console is also capable of communicating with a backend server 460. In aspects, these devices may communicate with one another over one or more of wired connections or wireless connections and may communicate over a network, such as a local area network, a wide area network, and/or the Internet.

According to the example of FIG. 4, the detectors 410 include detectors 410*a*, 410*b*, 410*c*, and 410*d*. Each detector may include a detection device 412 and a transceiver 414. For example, detector 410*a* includes detection device 412*a* and transceiver 414*a*, detector 410*b* includes detection device 412*b* and transceiver 414*b*, detector 410*c* includes detection device 412*c* and transceiver 414*c*, and detector 410*d* includes detection device 412*d* and transceiver 414*c*. In aspects, the detection devices include one or more of a microphone, a camera, a vibration sensor, an accelerometer, or others. For purposes of ease of discussion, it will be assumed that the detector device is a microphone configured for detecting audio events.

As shown in FIG. 4, the system 400 also includes a plurality of source devices 420, such as source device 420*a* and source device 420*b*. The source devices each include at least a processor 422, a transceiver 424, and an output device 226. For example, source device 420*a* includes processor 422*a*, transceiver 424*a*, and output device 226*a*, and source device 420*b* includes processor 422*b*, transceiver 424*b*, and output device 226*b*.

The system 400 also includes the central console 450. The central console includes a processor 452 and a transceiver 454. In aspects, the central console 450 may also communicate with a backend server 460.

In operation, the detectors 410 detect audio from the environment 300 using their detection devices 412 (e.g., microphones). In some aspects, the detectors 410 include their own processors, as shown for example in FIG. 5, that process the received audio data. For example, as discussed above, the alert system 400 is designed for alerting a user to certain events, which may be detected from certain audio occurrences. Therefore, in an aspects, when the detection device 412 of a detector 410 receives certain audio information, the processor performs audio analysis on the received audio in order to determine whether the audio is indicative of a particular event. For example, upon receiving audio information from the environment, the processor of the detector 410 performs audio analysis using any of a variety of known techniques and determines whether the received audio information is indicative of a known sound that warrants an alert, such as glass breaking. The detector 410 then transmits the detected audio along with the analysis result and/or alert decision to the central console 450.

In another aspect, the detectors 410 do not perform audio analysis, but rather merely collect and forward audio data obtained from the detection device 412. In this aspect, the audio data is transmitted to the central console 450. In this aspect, the central console 450 performs the audio processing in order to detect trigger events, as will be discussed in further detail below.

In operation, the source devices 420 perform detection of the audio streams being produced by their audio output devices 426. Specifically, as the audio data is processed for output (whether by local speakers at the television 310 or by the standalone speakers 320), the source device 420 performs the audio analysis to detect whether audio signal contains a triggering sound. For example, from the audio analysis, the source device 420 may determine that audio that is being output or is about to be output by the output device 426 is indicative of a sound likely to trigger an alert upon detection, such as the sound of glass breaking. Upon such detection, the source device 420 may take a variety of different actions in order to prevent false positives upon the sound being detected by one or more detectors 410 within the environment.

In an aspect, upon detecting a triggering sound the processor 422 located at the source device 420 performs a fingerprinting operation on the sound to be output. In an aspect, this involves adding an audio signal to the triggering sound that is detectable and known to the detectors 410. In an aspect, this sound will be outside of the range of human perception, but will be detectable by the detector devices 412 of the detectors 410. In various aspects, a single fingerprint may be used simply to notify the detectors 410 that the received sound should not trigger an alarm, or different fingerprints may be used to identify different sounds or source devices. In an aspect, only detectors 410 with high definition microphones will be capable of detecting the fingerprint. An example of a high definition microphone is a 192 kHz microphone (e.g., a microphone capable of detecting and capturing frequencies up to 192 kHz). However, the aspects of this disclosure can include other high definition microphones.

With the fingerprint added to the audio signal, the source device 420 outputs the sound to the environment. One or more of the detectors 410 receives the sound via their respective detector devices 412. In an aspect, a processor at the detector 410 performs audio analysis of the received signal to detect an alert-triggering sound. As part of this analysis, the fingerprint included within the received audio is detected, and the detector 410 suppresses the triggering of the alert. In another aspect, the detector 410 detects the audio and forwards the sound to the central console 450. The central console 450 performs the same analysis of the received audio in order to detect the fingerprint and suppress the alert trigger.

In another aspect, the source device 420 performs the front-end processing to detect the alert-trigger sound within the audio stream being output. But instead of fingerprinting the signal to be output, the source device 420 instead transmits a separate signal via one or more communication paths to the detectors 410 and/or the central console 450 that effectively warns those devices of the incoming sound and/or an approximate time that the sound will be output, which can be measured by clock time, delay time, etc. The detectors 210 receive this notification via their transceivers 414 and the central console 250 receives this notification via its transceiver 454. When the sound is received and the alert-triggering sound is detected, the detectors 410 will suppress the alert provided that the sound was received within a time window from when the sound was expected based on the notification signal. In aspects where the detectors 410 do not perform audio processing, they instead forward the received sound to the central console 450, which does the same.

In another aspect, the source devices 420 do not perform front-end detection processing on the audio being output. Instead, the detectors 410 include high frequency microphones capable of detecting directionality with respect to the received sound. Upon detecting the sound and the directionality of the received sound, the detectors 410 forward this information to the central console 450. The central console 450 aggregates sound detection results from the various detectors 410. Then, using the received information, the central console determines an originating location of the sound. If that location corresponds closely with a known source device 420 location, then the central console 450 suppresses the triggering of an alert. In aspects, the central console 450 has knowledge of the locations of the various detectors and source devices. In some aspects, the central console 450 may also be aware of locations of fixtures within the dwelling, such as doors, windows, etc. The location analysis by the central console 450 may further include comparing the originating location of the sound to these known locations and determining whether the sound appears to have originated from one of these fixtures. If the sound did not originate from a known location of a source device 420, or if the sound originated from a known location of a certain fixture capable of making the sound, then the central console triggers the alert.

In some aspects, the locations of the different objects (e.g., windows, doors, fixtures, or the like) can be obtained through a variety of different methods. For example, locations can be obtained through one or more cameras, such as a cellphone camera or other IoT camera. Additionally, or alternatively, depth sensors can be included within one or more different devices within the area, such as a television or speaker, to detect relative surroundings. From this information, the approximate locations of different fixtures within the area can be determined. These locations are then stored for later reference during alert detection.

In some aspects, an array of microphones can be distributed throughout the area, either independently or embedded into the various source and detection devices. In some examples, the layout of the array of microphones (e.g., the locations of the microphones) can be known to the system. Additionally, or alternatively, the layout of the array of microphones can be obtained by running a test signal through the system. Once the locations of the different microphones is known, the information of the microphones and their respective locations can be used to detect the spatial source of a sound within the environment. For example, detecting the same sound on a plurality of the known microphones, and comparing their relative intensities of the detected sound can allow for an accurate estimation of the source location of the sound. This allows the system to largely identify whether the sound originated from a known source or a known fixture within the environment.

Although the above aspects are described with respect to sound detection, it should be understood that other this description is equally applicable to other types of detectable occurrences, such as video or still images.

Figure 5:
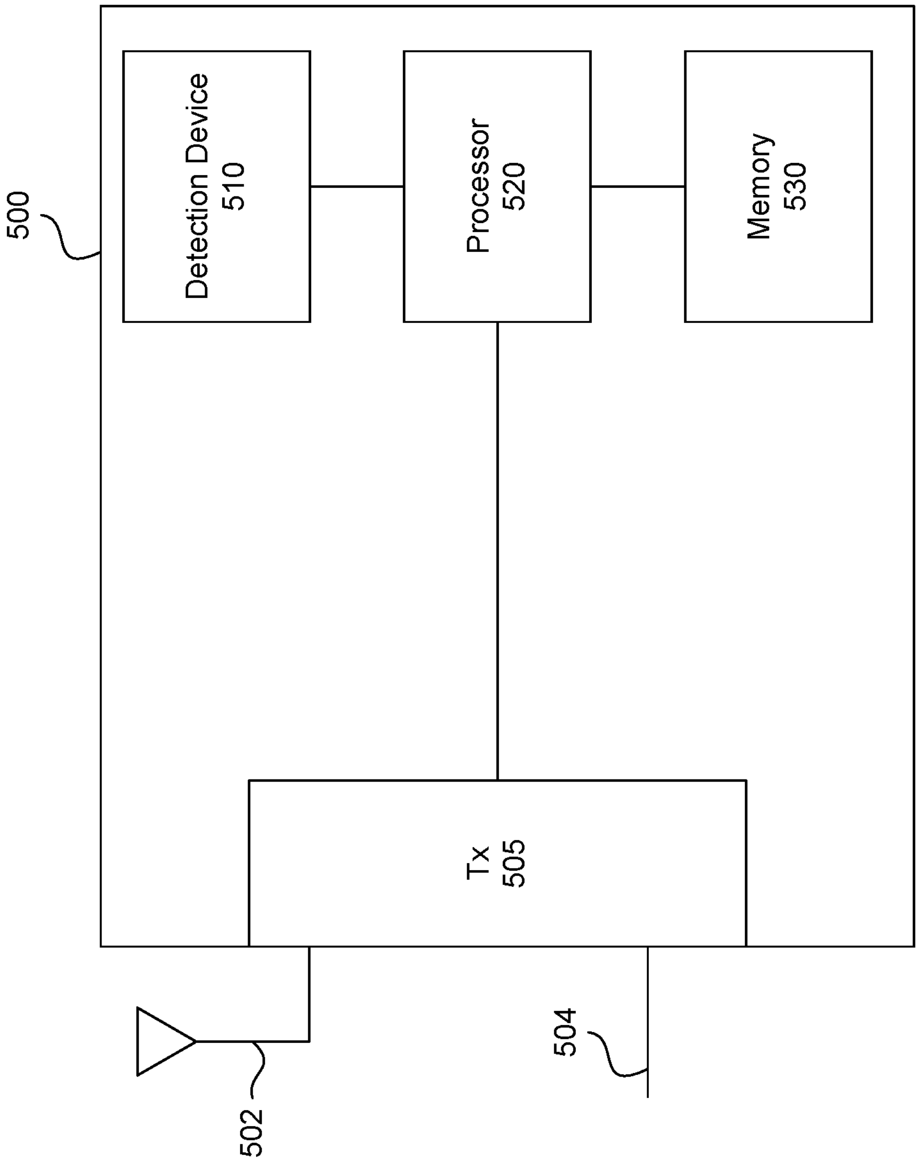
FIG. 5 illustrates a block diagram of an exemplary detector, according to some aspects.

FIG. 5 illustrates a block diagram of an exemplary detector 500, according to some aspects. As shown in FIG. 5, the detector 500 includes a detection device 510, a processor 520, a memory 530, and a transceiver 505. In various aspects, the transceiver may be capable of sending and receiving data over a wireless connection via antenna 502 using any available wireless communication standard or over a wired connection 504.

In aspects, the detection device 510 may include one or more of a microphone, a camera, an accelerometer, a thermometer, or any other sensor capable of detecting environmental changes. For ease of discussion, the operation of the detector 500 will be described with respect to sound detection. In this case, the detection device 510 includes one or more microphones. In an aspect, the microphones are high-frequency microphones capable of detecting directionality with respect to a received sound. Upon detecting a received sound, the detection device 510 forwards the sound (and the location where appropriate) to the processor 520.

In an aspect, the processor 520 receives the audio stream detected by the detection device 510 and performs audio processing on the received audio stream. The processing includes performing one or more comparative analyses on the received audio stream in order to detect a known alarm-triggering sound, such as a window break, a scream, a cry, etc. In aspects, the analysis may be performed in a time domain or in a frequency domain which will further involve performing one or more transforms on the received audio stream in order to convert the received audio to the frequency domain. In an aspect, a library of known alarm-triggering sounds and sound waveforms or frequency signatures is stored in memory 530. During the analysis, the processor 520 compares the received audio data to the stored audio data from memory 530.

In an aspect, in addition to analyzing the received audio stream for alarm-triggering sounds, the processor 520 also analyzes the received audio stream for a known signature signal. Specifically, as discussed above, audio source device within the environment can "sign" a known alarm-triggering sound with a signature sound that is outside of the range of human hearing but is detectable by a high-frequency microphone.

In an aspect, when an alarm-triggering sound is detected by the processor 520, the processor also checks to determine whether a signature is detected within the audio stream at or within a predetermined time from the alarm-trigger sound. If no signature is detected, the processor 520 causes the transceiver 505 to transmit a notification signal to a central console (e.g., the central console 250 of FIG. 2) so as to notify the central console of the alarm-triggering sound. On the other hand, if the signature is detected, then the processor 520 may either suppress notifying the central console or may cause the transceiver 505 to transmit the notification to the central console indicating that an alarm-triggering sound was detected but that a nullification signature sound was also detected. In various aspects, these may be identified by a minimum of two flags—one indicating the presence of the sound and the second indicating the presence of the signature. In an aspect, the notification signal includes the portion of the audio stream that includes the alarm-triggering sound and, if it was detected, the signature sound.

In another aspect, rather than the detector 500 detecting a signature sound within the audio stream, the detector 500 is notified of the incoming alarm-triggering sound from a source device. In this aspect, the transceiver 505 receives a notification message from a source device. In an aspect, the notification message identifies the source device and indicates the incoming sound likely to trigger the alarm—for example a glass break, or a gunshot sound. The processor 520 processes this notification to identify the incoming sound. Then, during the processing of the received audio stream, the processor 520 identifies an alarm-triggering sound. The processor 520 then determines whether the detected alarm-triggering sound matches the sound identified in the notification message, and whether the alarm-triggering sound was detected within a predetermined time of the receipt of the notification message. If both of these conditions are satisfied, then the processor 520 suppresses triggering the alarm. However, if one or both of these conditions is not met, then the processor 520 causes the transceiver 505 to transmit an alert notification to the central console.

In an another aspect, the detection device 510 is a high definition microphone capable of detecting directionality. In this aspect, the detection device 510 receives the audio stream from the environment, and is also capable of detecting a direction from which the sound originated. In this aspect, the processor 520 analyzes the received audio stream as above. However, when an alarm-triggering sound is detected, the processor then compares the directionality of the received sound to known source device locations. In an aspect, source device locations or directions are stored in the memory 530. In another aspect, the memory also stores locations or directions of certain fixtures, such as windows, doors, etc. within the environment. When the processor 520 determines that the sound originated from a direction or location of a known audio source device, then the processor suppresses triggering the alarm. However, when the processor 520 determines that the sound originated from a direction or location not corresponding to a known audio source device, then the processor 520 causes the transceiver 505 to transmit an alarm notification to the central console. In an aspect, the alarm notification includes the detected audio as well as the directionality of the alarm-triggering sound.

In various configurations, any multiple of the above aspects may be combined to provide an even more robust detection and false-positive suppression system. Additionally, any time that an alarm is suppressed, this information may be transmitted to the central console for aggregation and final determination. Finally, machine learning and/or artificial intelligence may be employed either at the processor 520 or at the central console in order to provide even further accuracy and selectivity of alarm-triggering sounds. For example, machine learning and/or AI can be used to separate human speech and/or other sounds of interest from background or ambient noise, such as dogs barking, leaves rustling, wind, etc. This allows detection even if the detection device isn't in the direct vicinity of the event. In an aspect where the detection device is a camera, the detection of the human speech can cause activation of the camera for detection purposes.

In some aspects, the machine learning and/or AI can also be used to determine which detected events are actually cause for concern based on user reaction (e.g., past user reaction) to those events and other information. For example, user reaction data can be gathered in response to an event detection and notification. This can be captured, for example, by the user providing a response to a particular event notification to disregard or discard this notification—e.g., clicking a button titled "don't notify me about this kind of event in the future." This data could also be obtained by the user providing a feedback with their voice to a remote control device, an IoT device with audio processing capabilities, or the like. These and other feedback mechanisms may allow for the collection of user reaction data to different alert notifications. This reaction data can then be used to further train the alert decision-making logic.

For example, if the system notifies a user about an alert involving wind blowing strongly on a window and the user gives explicit feedback that they do not wish to be notified about this in the future, then future similar alerts will be suppressed. Meanwhile, if the user gives conflicting feedback (either explicitly or implicitly) about the relevance or importance of a particular event, then additional contextual information can be used in order to disambiguate between events that should be notified to the user and those that shouldn't. For example, the system may determine that the user wants to be notified about any noise that occurs between 12:00 a.m. and 4:00 a.m., but does not want to be notified about a window knocking in the wind during work hours. Other contextual information could include time of year, others present in the house, etc.

Figure 6:
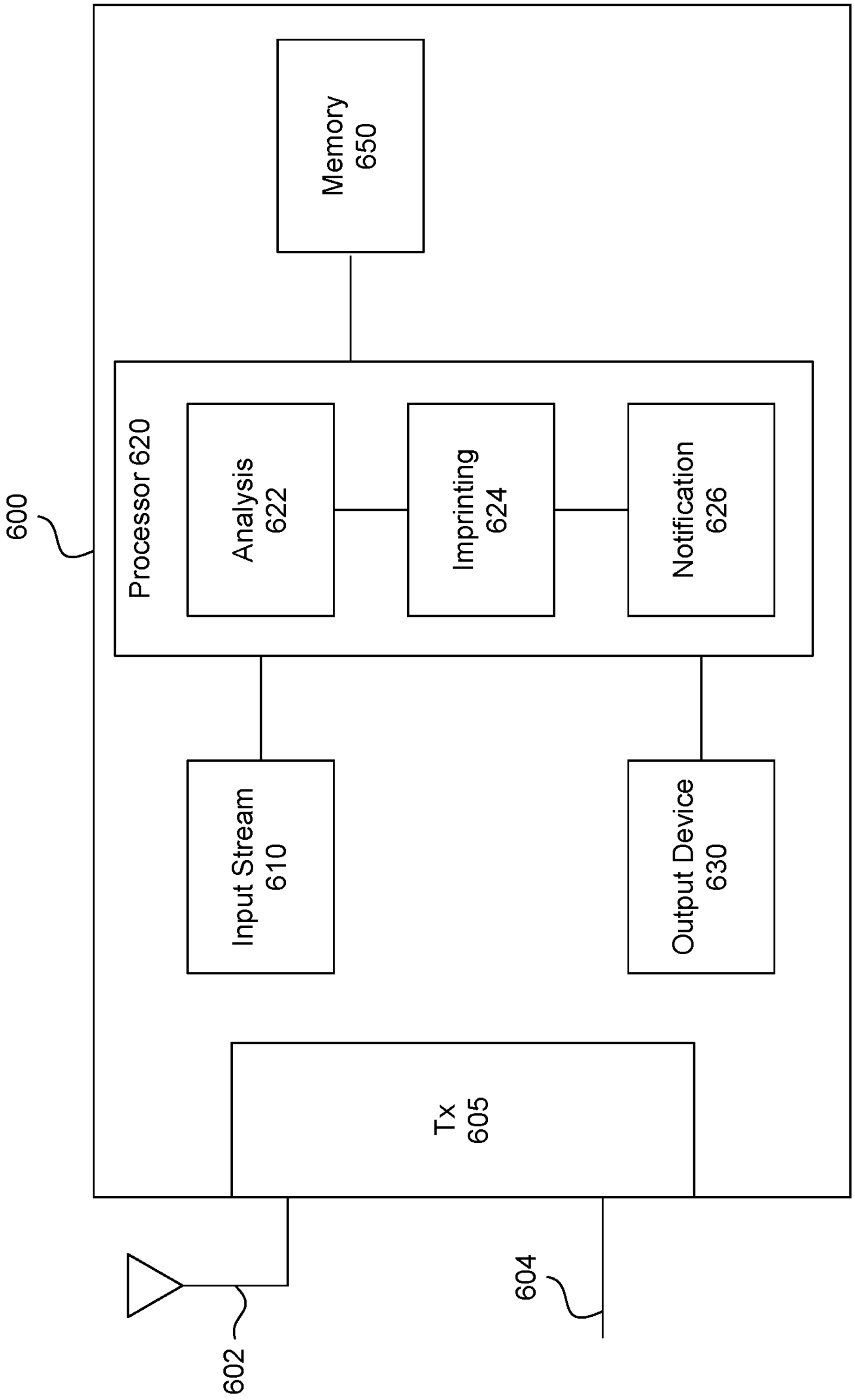
FIG. 6 illustrates a block diagram of an exemplary source device, according to some aspects.

FIG. 6 illustrates a block diagram of an exemplary source device 600, according to some aspects. As shown in FIG. 6, the source device 600 includes a transceiver 605, an input stream 610, a processor 620, and an output device 630. In an aspect, the transceiver 605 is connected to one or more antennas 602 and/or one or more wired communication connections 604.

In operation, the source device 600 receives audio data from the input stream 610. This information is passed through processor 620. The processor 620 includes an analysis block 622, an imprinting block 624, and/or a notification block 626. Upon receipt of the audio stream, the analysis block 622 performs audio analysis on the audio data within the audio stream. In aspects, the analysis may be performed in a time domain or in a frequency domain which will further involve performing one or more transforms on the received audio stream in order to convert the received audio to the frequency domain. In an aspect, a library of known alarm-triggering sounds and sound waveforms or frequency signatures is stored in memory 650. During the analysis, the processor 620 compares the received audio data to the stored audio data from memory 650.

When an alarm-triggering sound is detected in the audio stream, the source device 600 may take any of a number of different actions. In an aspect, the source device 600 causes the imprinting block 624 of the processor 620 to imprint a signature sound onto the alarm-triggering sound. In an aspect, the signature sound is a known waveform that is detectable by a microphone within the environment, but which is undetectable to human ears. Once this signature has been imprinted on or near the alarm-triggering sound, the sound is provided to the output device 630 for outputting the sound to the environment.

In another aspect, when an alarm-triggering sound is detected by the analysis block 622 of the processor 620, the notification block 626 generates a notification signal to be transmitted to the detectors within the environment and/or the central console. In an aspect, the notification signal includes an identification of the type of sound that is being sent, the sound waveform that will be transmitted, and/or a timestamp indicating a time at which the sound will be sent or when the sound is expected to be received. The processor 620 causes the transceiver 605 to transmit the notification message to the detectors and/or the central console via one or more of the antenna 602 or the wired connection 604. The audio stream is then provided to the output device 630 for output.

Figure 7:
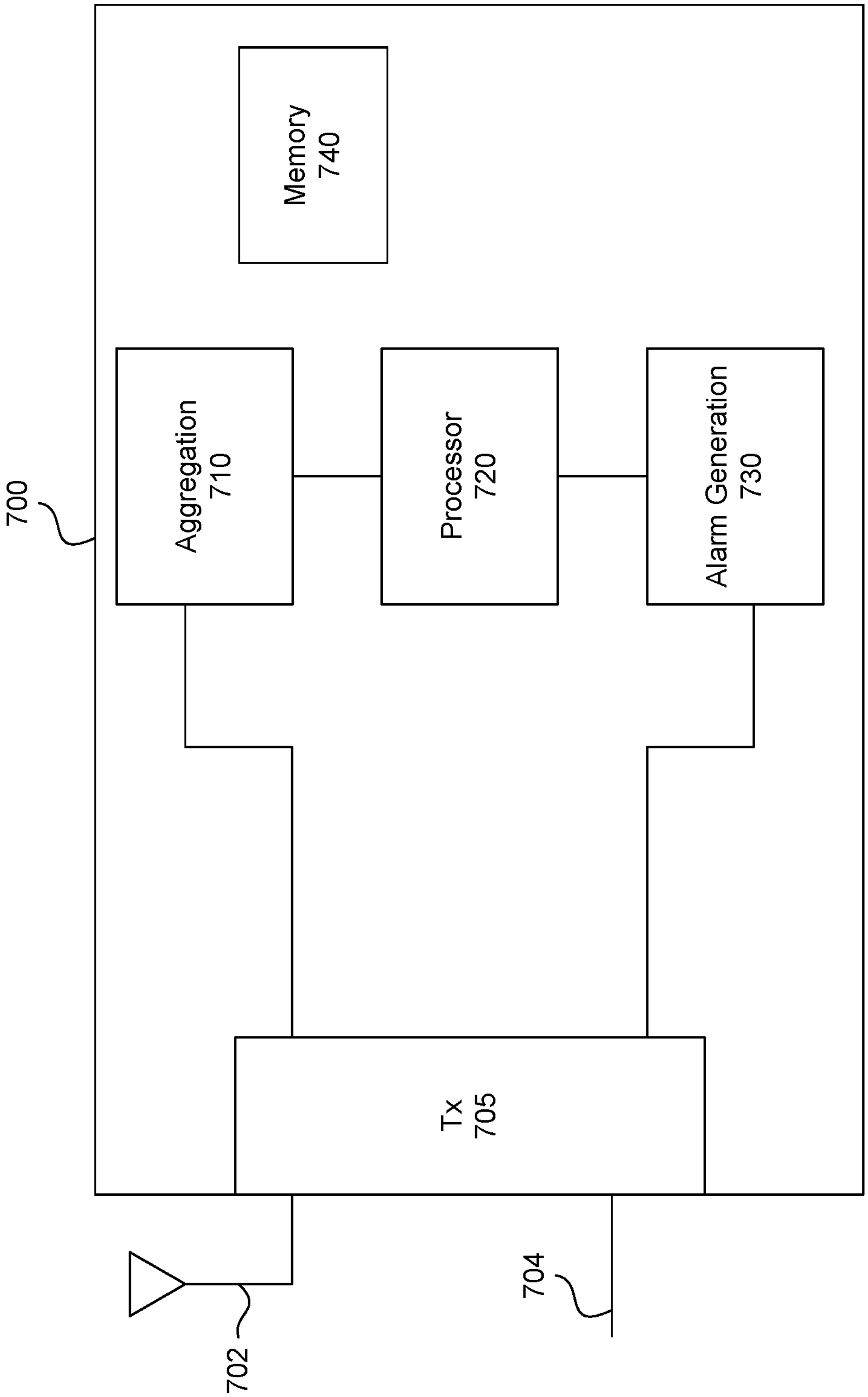
FIG. 7 illustrates a block diagram of an exemplary central console according to some aspects of the present disclosure.

FIG. 7 illustrates a block diagram of an exemplary central console 700 according to an aspects of the present disclosure. The central console 700 includes a transceiver 705, an aggregation block 710, a processor 720, and an alarm generation 730. In aspects, the aggregation 710 and alarm generation 730 block may be carried out by the processor 720.

In operation, the transceiver 705 receives notification messages from one or more detectors distributed throughout the environment. In aspects, these notification signals can include a detected sound that triggered an alarm, a suppression decision if any rendered by the detector, and/or a directionality from which the sound originated. As these notification messages are received, aggregation block 710 collects and organizes them. In some aspects, the aggregated notification data is stored in memory 740.

The processor 720 then performs an analysis of the aggregated data in order to determine whether or not to trigger the alarm. This analysis may include a determination of whether the various detectors agree that the alarm should or should not be triggered, an analysis of the accumulated directionalities, etc. For example, the processor may determine based on a voting system as to whether the detectors agree that the sound should or should not trigger the alarm. In an aspect, the vote only passes if there is agreement beyond a predetermined percentage of the reporting detectors. In an aspect, the processor can perform an independent analysis of the received sound waves receives from the various detectors to make an independent determination as to whether the sound should trigger the alarm or whether the alarm should be suppressed.

Additionally, the processor 720 may compare the received directionalities to known locations of source devices and/or fixtures within the environment in order to determine whether the sound originated from a source device. In an aspect, locations of the known source devices and/or fixtures are stored in the memory 740, as well as locations of the known detectors.

In the event that the central console 700 determines that the alarm should be triggered, processor 720 causes the alarm generation 730 to generate the alarm. In aspects, the alarm generation can cause a notification to be sent to a central office, the user's device, or within the environment.

Additionally, in some aspects, the transceiver 705 transmits a request message to a backend server for verification of the alarm decision. In aspects, this request message may include all the information relied upon to make the alarm determination by the processor. In this aspect, the central console 700 may receive a reply message from the backend server providing a final alarm determination. Additionally, or alternatively, rather than generating the alarm at the central console, the information and decision of the processor 720 can be forwarded to the backend server for verification and alarm generation.

Figure 8:
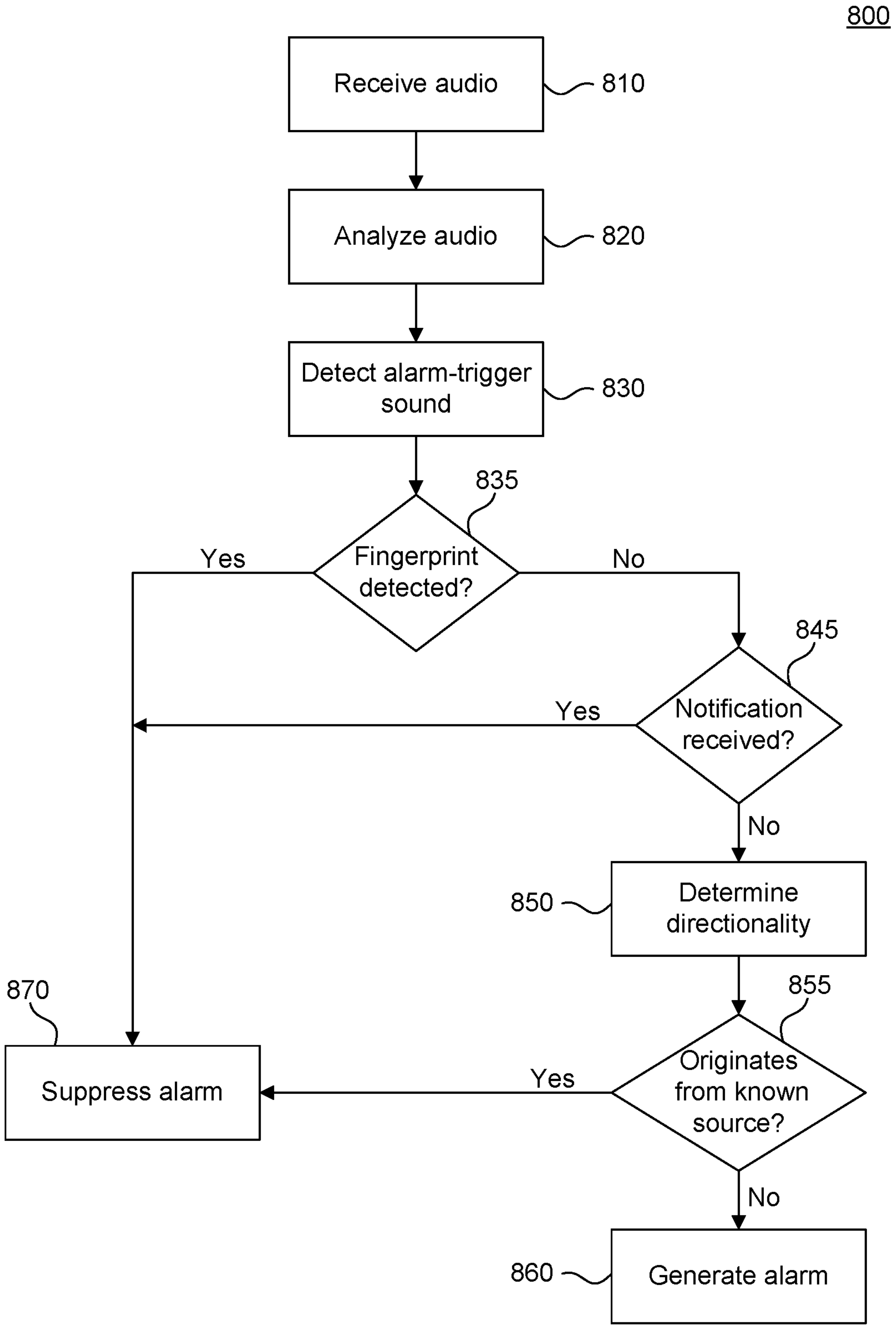
FIG. 8 illustrates a block diagram of an exemplary method for suppressing an alarm at a detector according to some aspects of the present disclosure.

FIG. 8 illustrates a block diagram of an exemplary method 800 for suppressing an alarm at a detector. For example, method 800 can be performed by detector 410 and/or detector 500. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

As shown in FIG. 8, the method 800 begins at step 810 with receiving of audio from the environment. In an aspect, the audio is received via one or more microphones at the detector. Although other environmental stimuli may be detected using other sensors, for purposes of this discussion and example, the method will be described with respect to receiving audio.

At step 820, the audio is analyzed. In different aspects, this analysis may include one or more of a time-domain or a frequency-domain analysis. As a result of the analysis, one or more waveforms may be identified.

At step 830, the waveforms obtained from the analysis are compared to known alarm-triggering waveforms. These sounds may be indicative of glass breaking, gunshot, scream, fall, etc. In an aspect, the comparison may be performed in one or more of the time domain or the frequency domain. As a result of the comparison, a determination may be made that the received audio includes a sound that triggers the alarm.

In response, at step 835, a determination is made regarding whether the received sound also included a fingerprint—e.g., a hidden sound waveform outside the range of human hearing, that is known to the receiver. If there is a fingerprint (835—Yes), then the alarm is suppressed in step 870.

If, on the other hand, there is no fingerprint detected (835—No), the a determination is made in step 845 as to whether a notification was received from either a source device or the central console, informing the receiver of the incoming alarm-triggering sound. If such a notification was received (845—Yes), the alarm is suppressed in step 870. If, on the other hand, no such notification was received (845—No), then the method proceeds to step 850.

In step 850, a determination is made as to the directionality of the sound. In other words, the receiver determines from where the sound originated. Then, in step 855, a determination is made regarding whether the sound originated from a known source device. If the sound originated from a known source device location (855—Yes), then the alarm is suppressed in step 870. If, on the other hand, the sound originated from a location that does not correspond to any known source device (855—No), then an alarm is generated in step 860.

Although the above method has been described as a step-wise cascade of steps, each of the different checks can instead be performed independent of the others and/or in parallel with the others. Additionally, although the method 800 has been described in terms of the detector making final determination as to trigger an alarm, the detector could instead transmit a notification signal to a central console for verification and final decision-making.

Figure 9:
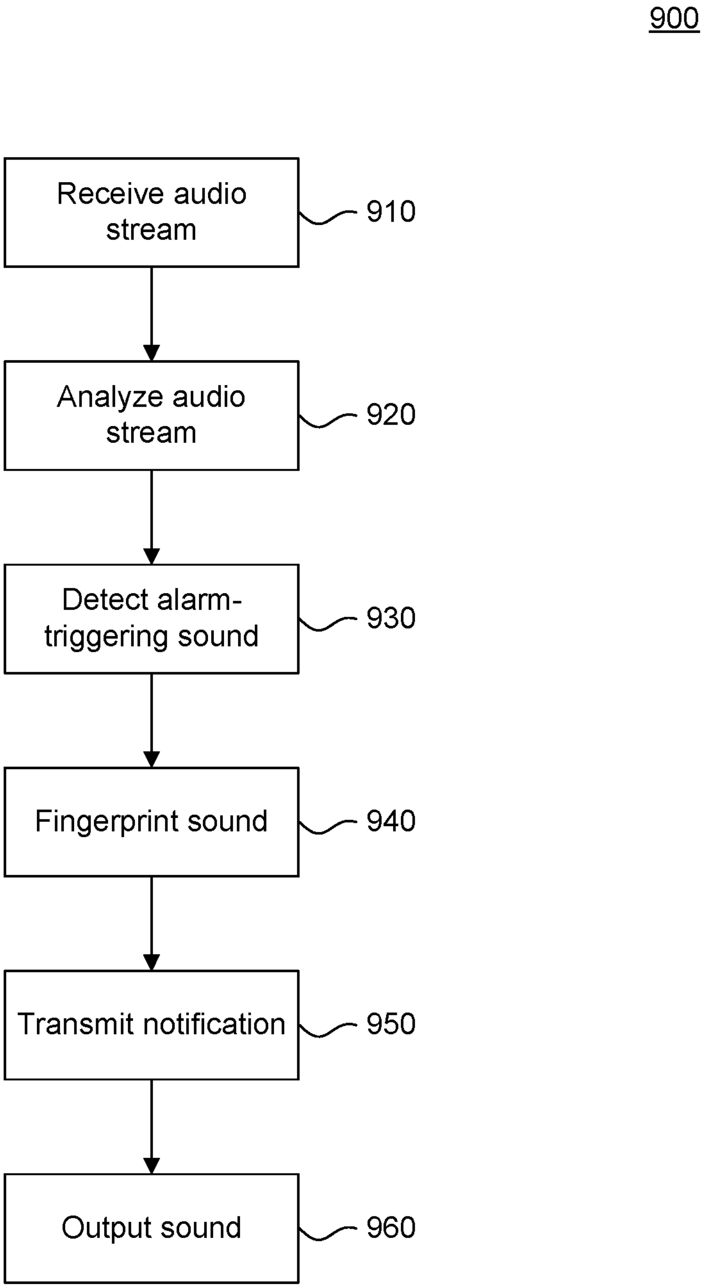
FIG. 9 illustrates a flowchart diagram of an exemplary method for pre-processing an outgoing alarm-triggering signal according to some aspects of the present disclosure.

FIG. 9 illustrates a flowchart diagram of an exemplary method 900 for pre-processing an outgoing alarm-triggering signal. For example, method 900 can be performed by source device 420 and/or source device 600. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

As shown in FIG. 9, the method begins at step 910 with the receiving of an audio stream. In an aspect, the audio stream is a digital audio stream for output to the environment. The audio stream can be received from content servers.

In step 920, audio analysis is performed on the received audio stream. In an aspect, the analysis includes analyzing the audio stream in one or more of the time domain or the frequency domain.

In step 930, the analyzed audio stream (e.g., sound signals of the audio stream) are compared against known alarm-triggering sounds in order to detect upcoming output of an alarm-triggering sound. In an aspect, such sounds may include one or more of glass breaking, gunshot, scream, fall, etc.

In step 940, a fingerprint sound wave is added to the alarm-triggering sound. In an aspect, the fingerprint is a sound wave that is known to the receivers/detectors within the environment and is outside of the human hearing range—the human hearing range is generally considered to be between 20 Hz and 20 kHz.

In step 950, a notification is transmitted to one or more external devices to notify those devices of the upcoming alarm-triggering sound. In an aspect, the notification signal may identify the source device and the type of alarm-triggering sound. Additionally, in an aspect, the notification may be sent to one or more detectors within the environment or a central console. In step 960, the alarm-triggering sound is output.

Although the above method 900 has been described as including both the fingerprinting and the notification, it should be understood that the method may instead include only one of these different processes. Additionally, or alternatively, these processes may be dependent on one another so that a second of them is only triggered based on the results of the first. Finally, the order of the method steps of FIGS. 8-10 can be rearranged according to the needs of the user.

Figure 10:
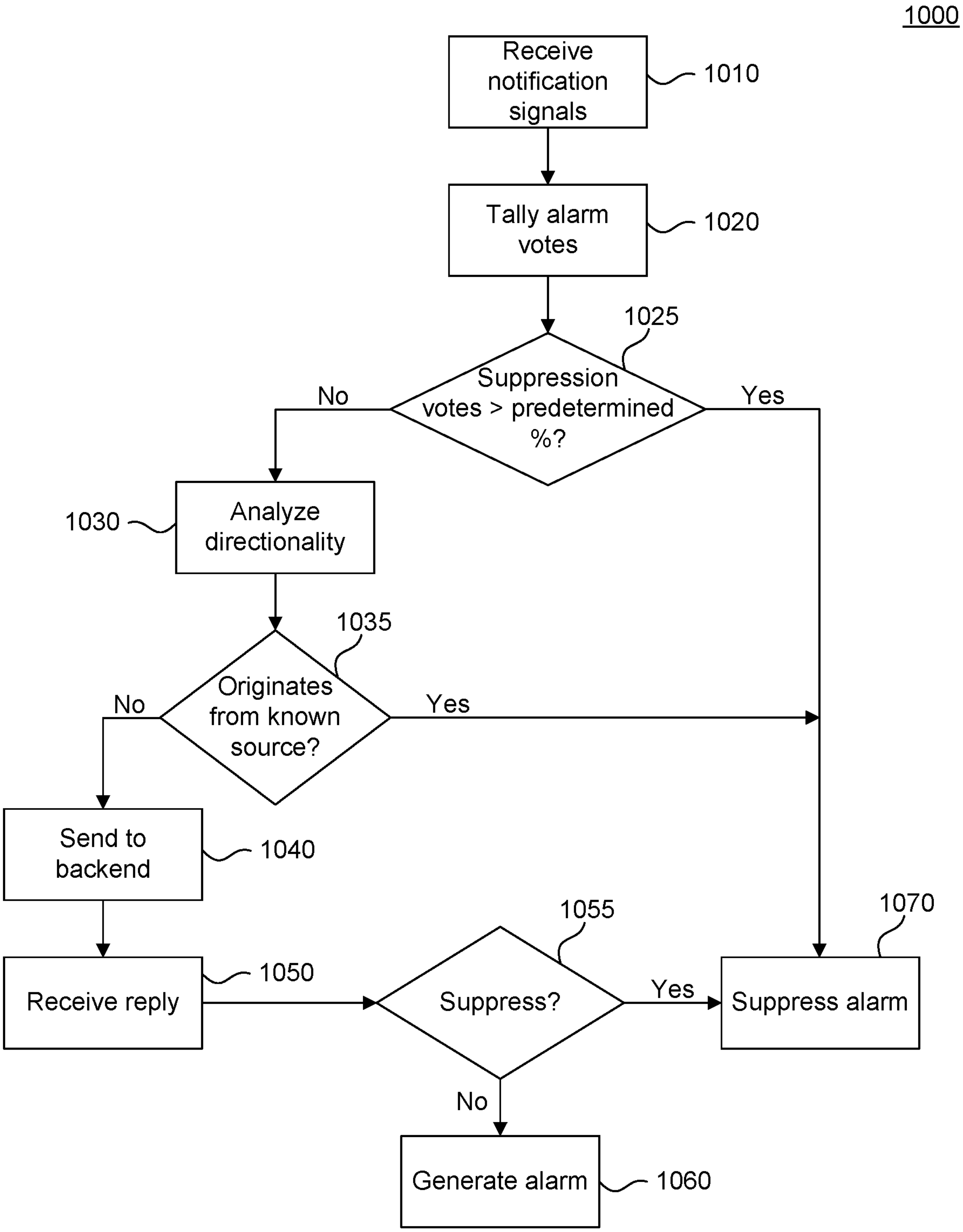
FIG. 10 illustrates a flowchart diagram of an exemplary method for aggregating and processing alarm notifications from detectors distributed throughout the environment according to some aspects of the present disclosure.

FIG. 10 illustrates a flowchart diagram of an exemplary method 1000 for aggregating and processing alarm notifications from detectors distributed throughout the environment. For example, method 1000 can be performed by central console 450 and/or central console 700. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

As shown in FIG. 10, the method 1000 begins at step 1010, where the central console receives notification signals from each of a plurality of different detectors in the environment. In aspects, the notification signals identify the type of sound detected, the directionality of the sound with respect to the detector, the time at which the sound was detected, a determination as to whether the alarm should be triggered based on the detection, any suppression factors detected, and/or detector identification.

In step 1020, the central console tallies the different decisions received in the notification signals from the various detectors. In an aspect, this involves determining the number of devices that reported the alarm-triggering sound, and the number of those that indicated to trigger the alarm versus the number of those that indicated to suppress the alarm.

In step 1025, a determination is made as to the percentage of detectors that indicated to trigger the alarm versus those that indicated to suppress the alarm. A further determination is made as to whether the percentage of votes to suppress the alarm is above a predetermined threshold. If the percentage is above the threshold (1025—Yes), then the alarm is suppressed in step 1070. If, on the other hand, the percentage is below the threshold (1025—No), then the method proceeds to step 1030.

In step 1030, the central console analyzes the directionality of the received audio signals for each of the reporting detectors. Using known locations of the detectors and the reported directionalities of the sounds they reported, the central console is able to determine if the alarm-triggering sound originated from a location corresponding with a known location of a source device.

In step 1035, a determination is made regarding whether the sound originated from a known source device location. If it did (1035—Yes), then the alarm is suppressed in step 1070. If, on the other hand, the sound did not originate from a known source device location (1035—No), then the method proceeds to step 1040.

In step 1040, the central console sends the relevant reporting information regarding the received sound detections to a backend server. In an aspect, this information includes one or more of the sound waves detected, the locations of the detectors, the directionalities detected by those detectors, the triggering decisions made by the detectors or the central consoles, etc.

In step 1050, the central console receives a reply message from the backend server indicating whether the alarm should be triggered or suppressed. In step 1055, a determination is made regarding whether the reply message indicated to suppress the alarm. If the reply message indicated to suppress the alarm (1055—Yes), then the alarm is suppressed in step 1070. If, on the other hand, the reply message indicated to trigger the alarm (1055—No), then the alarm is triggered in step 1060.

It should be understood that the steps of the above can be rearranged as needed according to the needs of the user and/or system. Additionally, more or fewer processes may be included within the method.

Example Computer System

Figure 11:
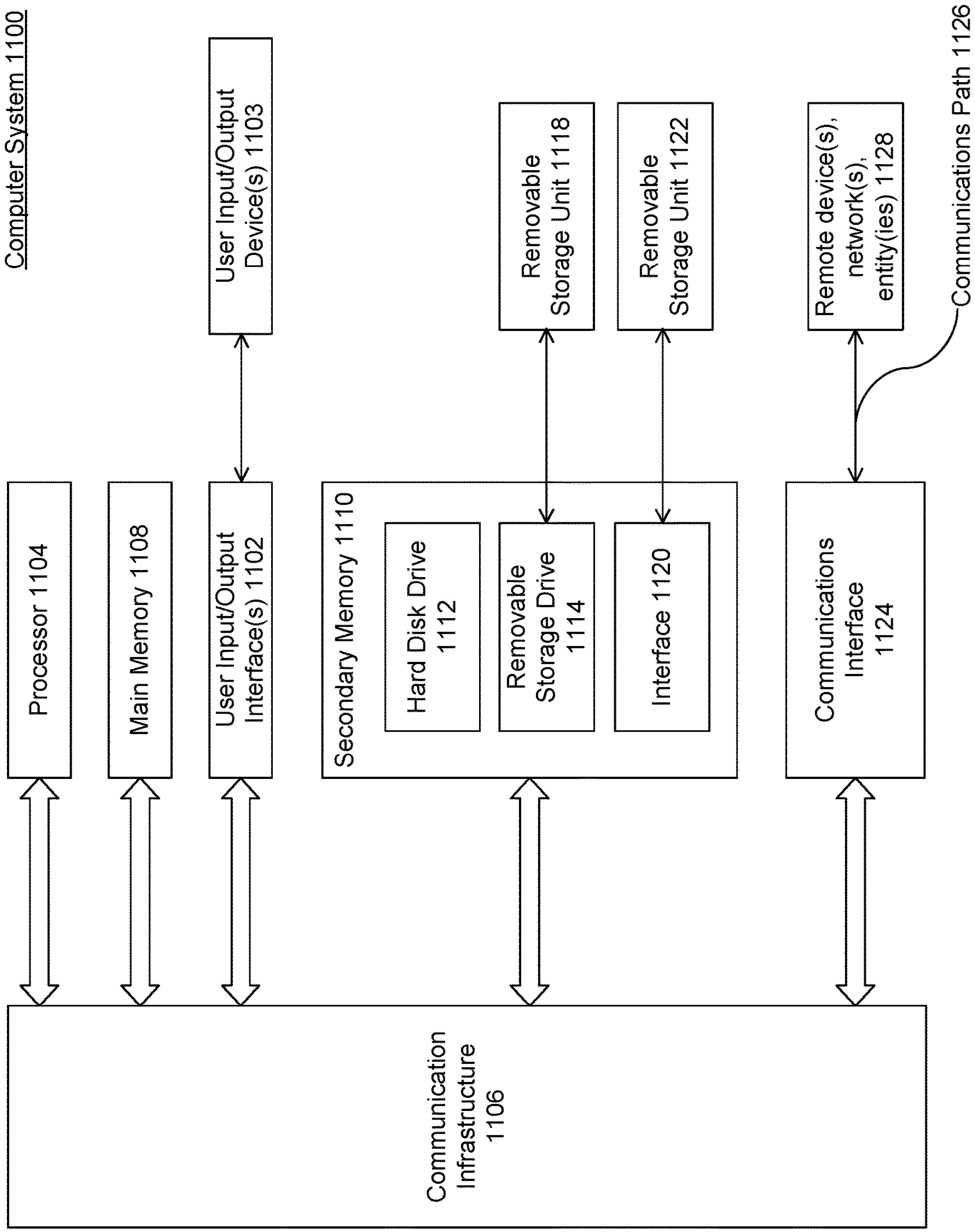
FIG. 11 illustrates an example computer system for implementing various aspects of the present disclosure.

Various aspects may be implemented, for example, using one or more well-known computer systems, such as computer system 1100 shown in FIG. 11. For example, one or more of detectors 410, source devices 420, or central console 250 may be implemented using combinations or sub-combinations of computer system 1100. Also or alternatively, one or more computer systems 1100 may be used, for example, to implement any of the aspects discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 11. In particular, aspects can operate with software, hardware, and/or operating system implementations other than those described herein.

Conclusion

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspect whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. An alarm system device, comprising:
- a detector device configured to detect audio information within an environment;
- one or more memories that store a plurality of alarm-triggering events; and
- at least one processor each coupled to at least one of the one or more memories and configured to perform operations comprising:
  - receiving the audio information from the detector device;
  - performing an analysis on the audio information;
  - detecting a match between the audio information and the plurality of alarm-triggering events based on the analysis;
  - determining, based on the analysis, that the audio information includes a fingerprint embedded therein; and
- suppressing an alarm based on the determining,
  - wherein the fingerprint is known digital information added to the audio information by a source device that generated the audio information, and
  - wherein the fingerprint is an audio signal added to the audio information by the source device that is outside a human hearing range.

2. The alarm system device of claim 1, wherein the detector device is a microphone.

3. The alarm system device of claim 2, wherein the microphone is a high definition microphone.

4. The alarm system device of claim 1, further comprising a transceiver configured to receive a notification message from an external device notifying the alarm system device of an incoming alarm-triggering event.

5. The alarm system device of claim 4, wherein the notification message further includes an identification of the alarm-triggering event and a timestamp.

6. The alarm system device of claim 5, wherein the operations further comprise:
- determining, based on the analysis, that the audio information corresponds to the identification included in the notification message;
- determining that the audio information was received within a predetermined time from the timestamp; and
- suppressing the alarm from being triggered by the audio information.

7. A computer-implemented method for suppressing false alarms within an alarm system environment, comprising:
- monitoring, by at least one computer processor, an environment;
- detecting audio information based on the monitoring;
- comparing the audio information to one or more known alarm-triggering events;
- determining, based on the comparing, that the audio information matches one of the known alarm-triggering events;
- analyzing, based on the determining, the audio information for a fingerprint embedded therein; and
- suppressing an alarm in response to the analyzing detecting the fingerprint,
- wherein the fingerprint is known digital information added to the audio information by a source device that generated the audio information, and
- wherein the fingerprint is an audio signal added to the audio information by the source device that is outside a human hearing range.

8. The computer-implemented method of claim 7, wherein the audio information is detected by one or more microphones.

9. The computer-implemented method of claim 7, wherein the fingerprint is associated with a source device that generated the event.

10. The computer-implemented method of claim 7, further comprising receiving a notification message from an external device, the notification message indicating that the event is incoming.

11. The computer-implemented method of claim 10, wherein the notification message is received via a separate communication channel.

12. The computer-implemented method of claim 11, wherein the notification message further includes an identification of the alarm-triggering event and a timestamp, the computer-implemented method further comprising:
- determining, based on the analysis, that the audio information corresponds to the identification included in the notification message;
- determining, that the audio information was received within a predetermined time from the timestamp; and
- suppressing the alarm from being triggered by the audio information.

13. A non-transitory computer-readable medium having stored thereon instructions that, when executed by at least one computing device, cause the at least one computing device to perform operations comprising:
- monitoring an environment;
- detecting audio information based on the monitoring;

comparing the audio information to one or more known alarm-triggering events;

determining, based on the comparing that the audio information matches one of the known alarm-triggering events;

analyzing, based on the determining, the audio information for a fingerprint embedded therein; and suppressing an alarm in response to the analyzing detecting the fingerprint, wherein the fingerprint is known digital information added to the audio information by a source device that generated the audio information, and wherein the fingerprint is an audio signal added to the audio information by the source device that is outside a human hearing range.

14. The non-transitory computer-readable medium of claim 13, wherein the fingerprint is associated with the source device.

15. The non-transitory computer-readable medium of claim 13, the operations further comprising receiving a notification message from an external device, the notification message indicating that the audio information is incoming.

16. The non-transitory computer-readable medium of claim 15, wherein the notification message further includes an identification of the alarm-triggering event and a timestamp, the operations further comprising:

determining, based on the analysis, that the audio information corresponds to the identification included in the notification message;

determining, that the audio information was received within a predetermined time from the timestamp; and suppressing the alarm from being triggered by the audio information.

* * * * *